(12) United States Patent
Challener

(10) Patent No.: US 8,165,300 B2
(45) Date of Patent: *Apr. 24, 2012

(54) SYSTEM AND METHOD FOR GENERALIZED AUTHENTICATION

(75) Inventor: David Carroll Challener, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 195 days.

This patent is subject to a terminal disclaimer.

(21) Appl. No.: 12/717,401

(22) Filed: Mar. 4, 2010

(65) Prior Publication Data

US 2010/0158253 A1 Jun. 24, 2010

Related U.S. Application Data

(63) Continuation of application No. 11/673,308, filed on Feb. 9, 2007, now Pat. No. 7,747,024.

(51) Int. Cl.
*H04L 9/00* (2006.01)
*H04L 9/32* (2006.01)
*G06F 7/04* (2006.01)

(52) U.S. Cl. ........ 380/276; 380/277; 380/279; 380/280; 380/281; 380/282; 713/168; 713/169; 713/170; 713/171; 726/27; 726/28; 726/29; 726/30

(58) Field of Classification Search .................... 380/278
See application file for complete search history.

(56) References Cited

U.S. PATENT DOCUMENTS

| 2002/0059286 A1 | 5/2002 | Challener | 707/100 |
|---|---|---|---|
| 2002/0144153 A1* | 10/2002 | LeVine et al. | 713/201 |
| 2004/0101141 A1 | 5/2004 | Alve | 380/278 |
| 2005/0102672 A1 | 5/2005 | Brothers | 718/1 |
| 2006/0117015 A1 | 6/2006 | Bisbee et al. | 707/9 |

FOREIGN PATENT DOCUMENTS

GB 2399902 A 9/2004

* cited by examiner

*Primary Examiner* — Longbit Chai
(74) *Attorney, Agent, or Firm* — VanLeeuwen & VanLeeuwen; Carlos Munoz-Bustamante

(57) ABSTRACT

A system, method, and program product is provided that uses environments to control access to encryption keys. A request for an encryption key and an environment identifier is received. If the encryption key is not associated with the environment identifier, the request is denied. If they are associated, the system receives user-supplied environment authentication data items from a user. Examples of environment authentication data include passwords, user identifiers, user biometric data (e.g., fingerprint scan, etc.), smart cards, and the like. The system retrieves stored environment authentication data items from a secure (e.g., encrypted) storage location. The retrieved stored environment authentication data items correspond to the environment identifier that was received. The received environment authentication data items are authenticated using the retrieved stored environment authentication data items. If the authentication is successful, the user is allowed use of the requested encryption key, otherwise, the request is denied.

23 Claims, 8 Drawing Sheets ical keys are then associated with one or more policies, with each of the policies being associated with one or more of the environment authentication schemes.

SYSTEM AND METHOD FOR GENERALIZED AUTHENTICATION

RELATED APPLICATION

This application is a continuation of application Ser. No. 11/673,308 filed Feb. 9, 2007, titled "System and Method for Generalized Authentication," having the same inventor as the above-referenced application, and issued as U.S. Pat. No. 7,747,024 on Jun. 29, 2010.

BACKGROUND OF THE INVENTION

1. Technical Field

The present invention relates to a system and method that authenticates a user to a computer system. More particularly, the present invention relates to a system and method that authenticates use of an encryption key based on a requested environment and user-supplied authentication data corresponding to the requested environment.

2. Description of the Related Art

A Trusted Platform Module (TPM) is a microchip that is included in a computer system's motherboard during manufacturing. A TPM provides facilities for secure generation of cryptographic keys, facilities to limit the use of keys for a particular purpose (e.g., for either signing, verification or encryption, decryption, etc.). The TPM also provides a hardware-based Random Number Generator.

In addition, the TPM can be used to authenticate a hardware device, such as the computer system where the TPM is installed. Because each TPM chip is unique to a particular device (e.g., computer system, etc.), it can perform platform authentication. While a TPM provide cryptographic functions that can be used to protect sensitive information, it does face certain challenges.

One challenge faced by a TPM is difficulty moving cryptographic keys from one system to another system. Because each TPM is a hardware-based cryptographic device unique to a particular device, keys generated using one computer system's TPM cannot easily be moved to another computer system without re-encrypting the keys using the new system's TPM.

Another challenge of a traditional TPM approach is that the computer system acts as a single environment. Users that use a common computer system often have to share keys in order to access sensitive information from the computer system. Removing access to one of the users often involves creating a new key shared with the remaining users.

SUMMARY

It has been discovered that the aforementioned challenges are resolved using a system, method and computer program product that uses environments to determine whether to allow a user to use a requested encryption key. The system receives an encryption key request for the encryption key along with receiving an environment identifier. The system determines whether the received environment identifier is associated with the requested encryption key. If they are not associated, the request is denied. If they are associated, the system receives one or more user-supplied environment authentication data items from a user. Examples of environment authentication data include passwords, user identifiers, user biometric data (e.g., fingerprint scan, etc.), smart cards, and the like. The system retrieves stored environment authentication data items from a secure (e.g., encrypted) storage location. The retrieved stored environment authentication data items correspond to the environment identifier that was received. The received environment authentication data items are authenticated using the retrieved stored environment authentication data items. If the authentication is successful, the user is allowed use of the requested encryption key, otherwise, the request is denied.

In one embodiment, in order to determine whether the received environment identifier is associated with the requested encryption key, the system determines whether the requested encryption key is associated with a policy and also determines whether the requested environment identifier is associated with the policy.

In another embodiment, the stored environment authentication data and the requested encryption key are each encrypted with a User Migratable Storage Key (UMSK). The UMSK is encrypted with a Storage Root Key (SRK), and the SRK is maintained within a hardware-based Trusted Platform Module (TPM) within the computer system that is being used by the user. The requested encryption key, the stored environment authentication data items, and the UMSK are stored on one or more nonvolatile storage devices accessible to the computer system.

In a further embodiment, the stored environment authentication data items are exported from the computer system to a second computer system, with the system being interconnected using a common computer network. The exporting includes receiving a public key that corresponds to the second information handling system. The public key can be received from a trusted third party that provides public keys, such as public key certificates. The stored environment authentication data is encrypted at the exporting computer system using the UMSK and then the decrypted stored environment authentication data is re-encrypted using the public key that was received. The exporting computer system then transmits the stored environment authentication data that has been encrypted with the public key to the second information handling system via the computer network. The receiving, or importing, computer system then imports the stored environment authentication data by first receiving the stored environment authentication data that has been encrypted with the public key and storing the encrypted stored environment authentication data on a nonvolatile storage device (e.g., a hard drive) accessible to the importing computer system. The imported stored environment authentication data is then associated with a policy on the imported second computer system. The policy is associated with one or more encryption keys stored on the second computer system.

In another embodiment, prior to receiving the encryption key request, a number of environment authentication schemes are created that pertain to a number of users (such as the main user, the main user's assistant, the main user's spouse, etc.). Each of the environment authentication schemes includes one or more environment authentication data items. For example the authentication scheme for the main user may require biometric data (e.g., a fingerprint), while the biometric data used by the main user's spouse may require a user identifier and a password. The environment authentication schemes are encrypted with the UMSK. One of the environment authentication schemes is selected based on the received environment identifier. The environment authentication data items included in the selected environment authentication scheme is used to authenticate the user given the authentication data provided by the user.

In a further embodiment, policies are created and each policy is encrypted with the UMSK. The encryption keys are also created and encrypted using the UMSK. The encryption keys are associated with policies and the policies are associated with environment authentication schemes.

In a further embodiment, the determination of whether the received environment identifier is associated with the requested encryption key further includes determining whether the requested encryption key is associated with one of the policies that is associated with the received environment identifier that corresponds to one of the created environment authentication schemes. The UMSK, stored environment authentication schemes, policies, and encryption keys are migrated to a second computer system by decrypting, within the TPM, the UMSK. The UMSK is re-encrypted, within the TPM, using a public key corresponding to a second SRK maintained by a second TPM within the second computer system. The re-encrypted UMSK is transferred from the first computer system to the second computer system, the stored environment authentication schemes, policies, and encryption keys are also copied from the first computer system to the second computer system. In addition, the associations between the environment authentication schemes and the policies and the associations between the policies and the encryption keys is also copied from the first computer system to the second computer system.

In a further embodiment, when a user of the second computer system wishes to use one of the encryption keys, the user provides an encryption key request and an environment identifier. The second computer system determines whether the received second environment identifier is associated one of the policies copied to the second information handling system that is associated with the requested second encryption key. If no association exists, the request is denied by the second computer system. However, if an association exists, the user supplies environment authentication data that are compared to the stored environment authentication data that was copied to the second computer system. The environment authentication data supplied by the user is authenticated and, if successful, the user is allowed use of the requested encryption key. On the other hand, if the authentication is not successful, the request for use of the encryption key is denied.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
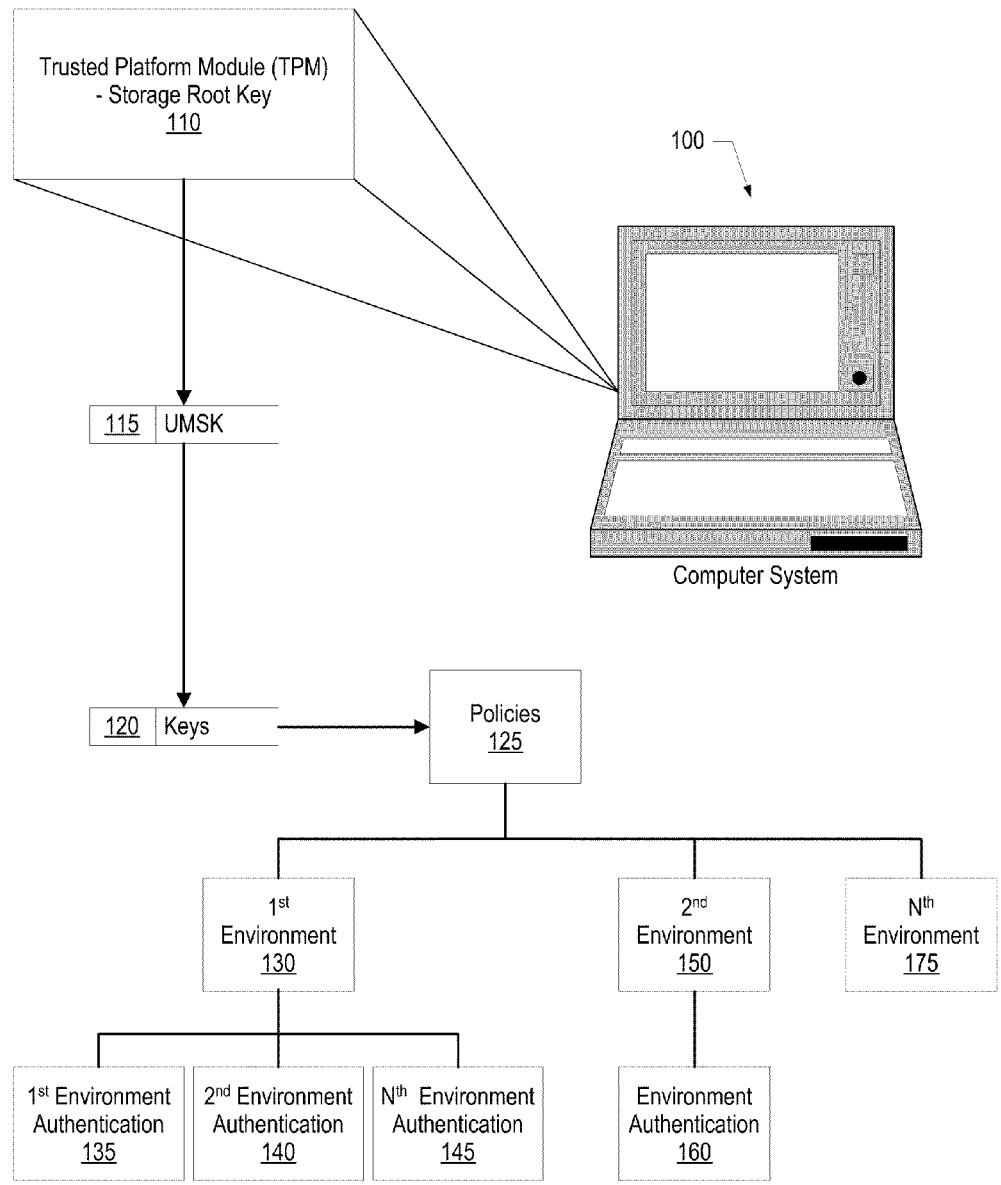
FIG. 1 is a high-level diagram showing components used to associate environment authentication data with policies and encryption keys.

FIG. 1 is a high-level diagram showing components used to associate environment authentication data with policies and encryption keys. Computer system 100 includes a Trusted Platform Module (TPM 110) which is a hardware based component that manages a Storage Root Key (SRK) that is used to encrypt data stored on computer system 100. The Storage Root Key is used to encrypt a User Migratable Storage Key (UMSK 115) that is a key that, as the name implies, can be migrated from one computer system to another computer system. The User Migratable Storage Key is, in turn, used to encrypt further encryption keys 120, policies 125, and environments 130, 150, and 175. In one embodiment, the User Migratable Storage Key is a storage encryption key, while encryption keys 120 are general encryption keys that are used for a wide-variety of encryption needs (e.g., usage encryption keys, storage encryption keys, etc.).

In one embodiment, encryption keys 120 are associated with one or more policies 125. Policies, in turn, are associated with one or more environments 130, 150, and 175. In another embodiment, encryption keys 120 are associated directly to the environments without using the policies. Environments include an environment identifier that uniquely identifies the environment and an environment scheme. An environment scheme includes one or more environment authentications used to authenticate a user with the given environment. For example, first environment 130 is an environment scheme that includes three sets of environment authentication data items used to authenticate a user with the environment (authentication data items 135, 140, and 145). Examples of authentication data include biometric data (e.g., fingerprint scan, etc.), passwords, smart cards, and other user identifiers. Second environment 150 is an example of an environment scheme that includes a single authentication data item.

When a user requests one of encryption keys 120 they identify the environment authentication data that they intend to provide in order to authenticate themselves. If the requested encryption key is associated with a policy that is associated with the environment identifier provided by the user, then the user can authenticate themselves by providing the environment authentication data required by the particular environment scheme.

Figure 2:
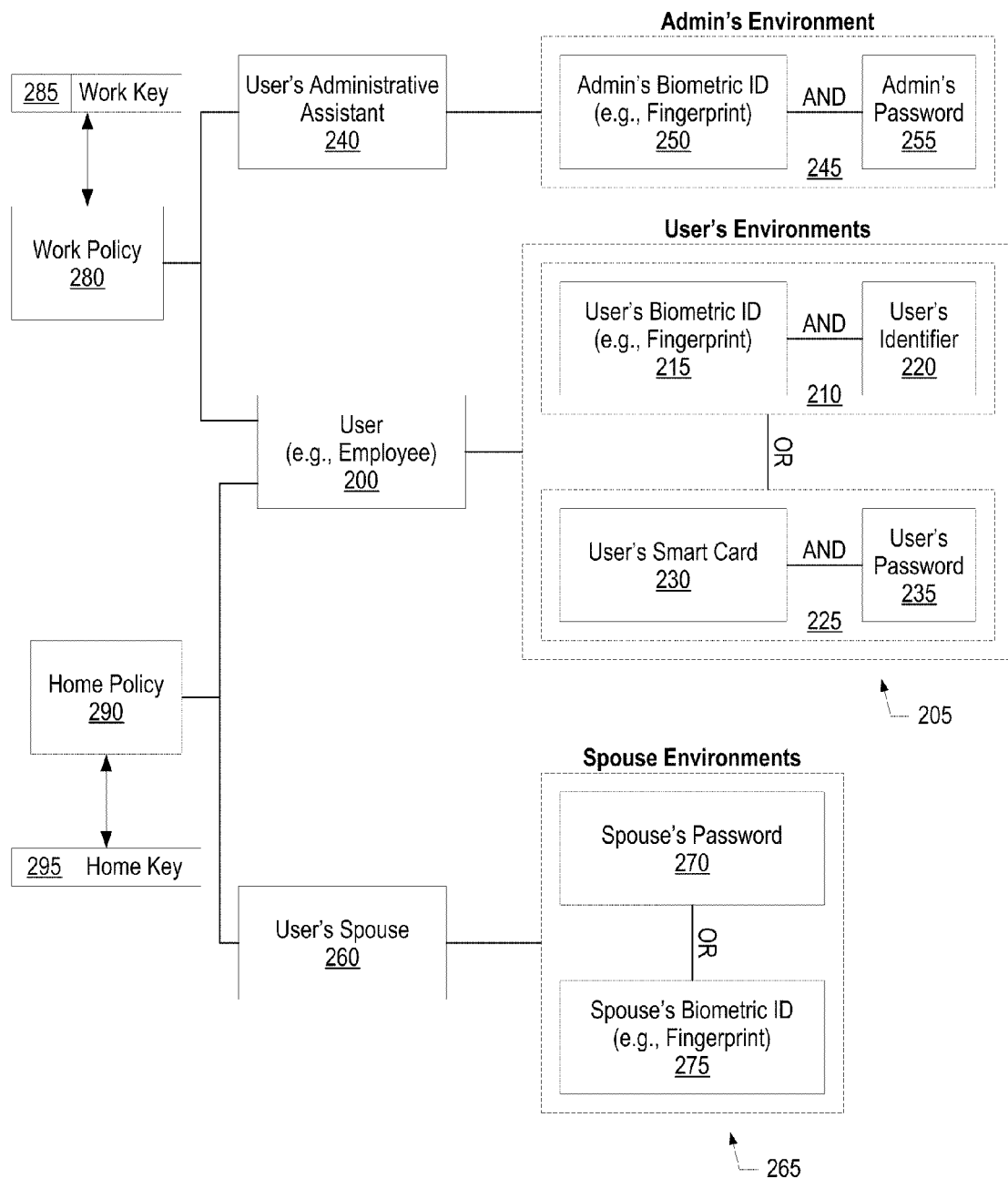
FIG. 2 is a diagram showing various environment authentication data being associated with various users that need access to various encryption keys.

FIG. 2 is a diagram showing various environment authentication data being associated with various users that need access to various encryption keys. In the example, main user 200, such as an employee in an organization, uses two different encryption keys on the computer system. Work key 285 is an key used to perform work tasks for the employer, such as access the employer's computer network or access an information system used by the employer. Work key 285 is associated with work policy 280. Home key 295 is an encryption key used to perform home-based, or personal, tasks, such as accessing the user's joint bank account that is shared with the user's spouse, accessing the user's personal financial system (e.g., Quicken™, etc.), or any number of personal (non-business) systems. Home key 295 is associated with home policy 290.

Administrative assistant 240 and user's spouse 260 also use the user's computer system to perform business and home-related computing tasks, respectively. In the example shown, user environments 205 include environment authentication scheme 210 and environment authentication scheme 225. Either authentication scheme can be used to authenticate user 200 and allow the user use of either work encryption key 285 or home encryption key. When the user requests a key, the user identifies the environment authentication scheme that is being used by the user (e.g., by providing an environment identifier corresponding to the chosen environment scheme, by providing the authentication data and having the system match the provided data with one of the environment schemes, etc.). If the user is using environment authentication scheme 210, then the user-supplied environment authentication data items supplied by the user include the user's biometric data 215 (e.g., a fingerprint scan), and a user identifier 220. If the user is using environment authentication scheme 225, then the user-supplied environment authentication data items supplied by the user include the user's smart card 230, and the user's password 235. Note that the environment authentication data provided by user 200 is associated with both work policy 280 as well as home policy 290 and, thus, by providing the user-supplied environment authentication data items in either environment authentication scheme 210 or 225 allows user 200 use of either work key 285 or home key 295.

When the user's administrative assistant 240 is using the computer system and needs to use an encryption key, the admin's environment authentication scheme 245 is used as this is the only authentication scheme assigned to the user's administrative assistant. To use environment authentication scheme 245, the user's administrative assistant provides user-supplied authentication data items of the administrative assistant's biometric data 250 (e.g., the administrative assistant's fingerprint scan) and the administrative assistant's password 255. Note that the environment authentication data provided by the administrative assistant is only associated with work policy 280 and, thus, by providing the user-supplied environment authentication data items in environment authentication scheme 245 allows administrative assistant 240 access to work encryption key 285, but does not allow the administrative assistant use of home encryption key 295.

Likewise, when the user's spouse 260 is using the computer system and needs to use an encryption key to access or use a home-based system, such as the joint bank account or financial planning software, the spouse's environments 265 are used. The spouse's environments include two environment authentication schemes 270 and 275. In this case, the spouse can provide user-supplied authentication data matching spouse's password 270 or can provide spouses biometric data 275 (e.g., the spouse's fingerprint scan) in order to be authenticated and allowed use of home encryption key 295. Note again that the environment authentication data provided by the spouse is only associated with home policy 290 and, thus, by providing the user-supplied environment authentication data items matching either environment schemes 270 or 275 allows spouse 260 access to home encryption key 295, but does not allow the spouse use of work encryption key 285.

Figure 3:
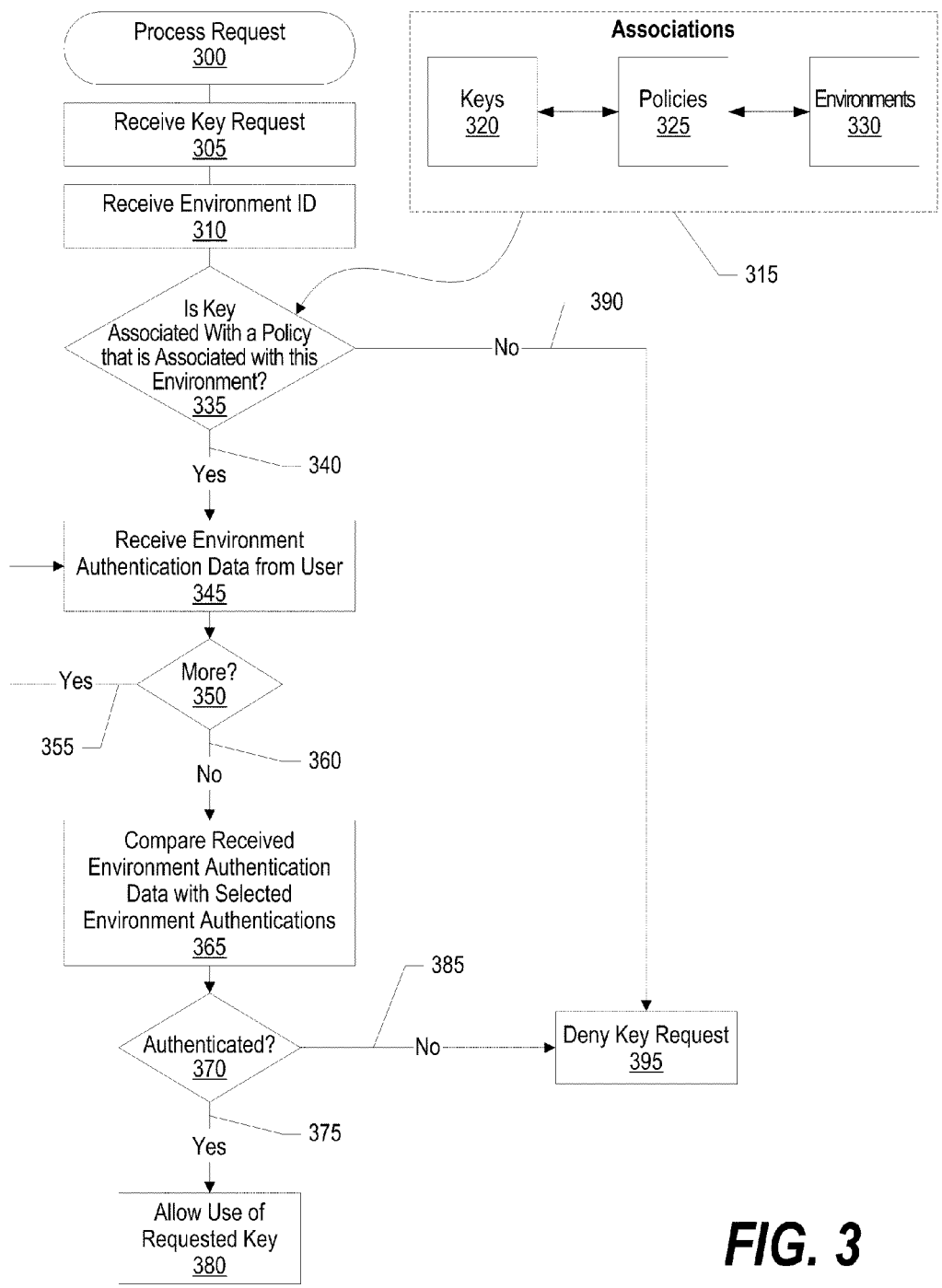
FIG. 3 is a flowchart showing the steps used to process a request for a given encryption key.

FIG. 3 is a flowchart showing the steps used to process a request for a given encryption key. Processing commences at 300 whereupon, at step 305, a request for a given encryption key is received and, at step 310, an identifier of an environment is received. In one embodiment, the environment identifier is a unique environment name or number provided by the user or selected from a list of available environments. In another embodiment, the environment identifier is provided by receiving user-supplied environment authentication data and matching the received data to environment authentication schemes.

A determination is made as to whether the requested encryption key is associated to a policy that is associated to the selected environment identifier (decision 335). Associations diagram 315 depicts the relationship between encryption keys 320, policies 325, and environments 330. As shown, encryption keys 320 are associated with policies 325 and policies 325 are associated with environments 330. If the requested encryption key is not associated with a policy that is associated to the selected environment identifier, then decision 335 branches to "no" branch 390 and the user is denied use of the requested encryption key at step 395.

On the other hand, if the requested encryption key is associated with a policy that is associated to the selected environment identifier, then decision 335 branches to "yes" branch 340 whereupon, at step 345, the first user-supplied environment authentication data item is received from the user. Examples of user-supplied environment authentication data items include passwords, biometric data (e.g., fingerprint scan), smart cards, and other user identifiers. The specific user-supplied environment authentication data items required for a particular environment are based on the environment scheme (see FIG. 2 for various environment scheme examples). A determination is made as to whether more user-supplied environment authentication data items are required for the environment corresponding to the requested environment identifier (decision 350). Some environments might require a single user-supplied environment authentication data item (see, e.g., environments 270 and 275 in FIG. 2), while other environments require more than one data item (see, e.g., environments 210, 225, and 245 in FIG. 2). If more user-supplied environment authentication data items are needed, decision 350 branches to "yes" branch 355 which loops back to receive the next user-supplied environment authentication data item from the user. This looping continues until all required environment authentication data items have been provided by the user, at which point decision 350 branches to "no" branch 360.

At step 365, the user-supplied environment authentication data items are compared with stored environment authentication data items that are retrieved from a secure location. In one embodiment, the stored environment authentication data items are stored on a nonvolatile storage device and encrypted using the User Migratable Storage Key. Based on the comparison, a determination is made as to whether the user-supplied environment authentication data items successfully authenticated the user given the selected environment scheme (decision 370). If the user is successfully authenticated (e.g., the correct passwords, biometric data, etc. was supplied), then decision 370 branches to "yes" branch 375 and the user is allowed use of the requested encryption key at step 380. On the other hand, if the user is not successfully authenticated, then decision 370 branches to "no" branch 385 whereupon the user's request to use the encryption key is denied at step 395.

Figure 4:
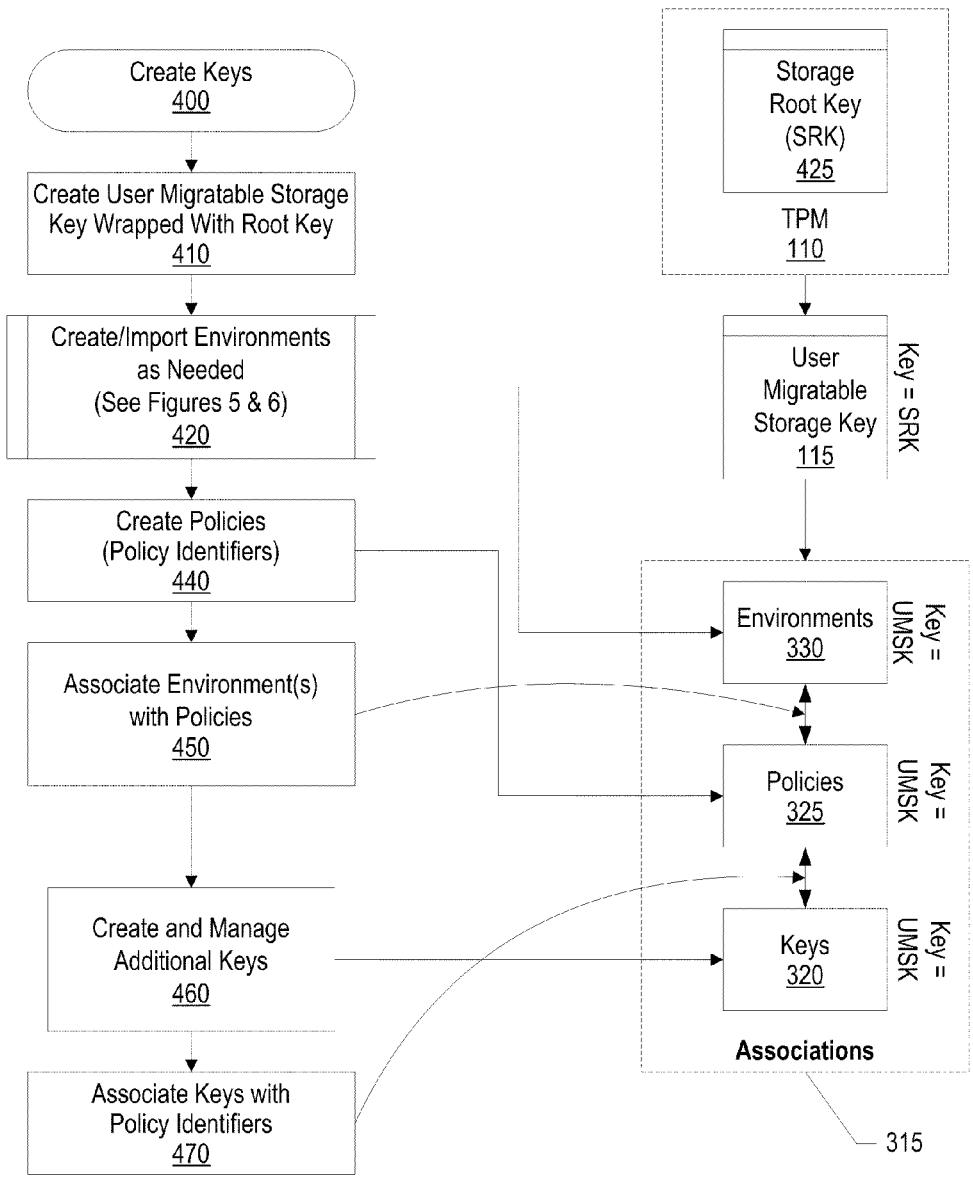
FIG. 4 is a flowchart showing the steps used to create encryption keys and associated policies and environments.

FIG. 4 is a flowchart showing the steps used to create encryption keys and associated policies and environments. Processing commences at 400 whereupon, at step 410, a User Migratable Storage Key is created and encrypted using the Storage Root Key. In one embodiment, TPM 110 is used to generate User Migratable Storage Key 115 as well as to encrypt the created User Migratable Storage Key with Storage Root Key 425. Environments 330 are created and imported at predefined process 420 (see FIG. 5 and corresponding text for processing details regarding environment creation and see FIG. 6 and corresponding text for processing details regarding importing environments). At step 440, policies 325 are created (see FIG. 2 for examples of polices including a "work policy" and a "home policy"). At step 450, environments are associated with policies (see FIG. 2 which depicted a "work policy" being associated with an employee's environments as well as the employee's administrative assistant and a "home policy" being associated with the user and the user's spouse).

At step 460, additional keys 320 are created and managed (see FIG. 2 and corresponding text depicting a "work encryption key" and a "home encryption key" for use in accessing work and home computing functions, respectively). At step 470, created encryption keys 320 are associated with policies 325 (see FIG. 2 which depicted the "work encryption key" being associated with the "work policy" and the "home encryption key" being associated with the "home policy"). In one embodiment, encryption keys 320, policies 325, and environments 330 are each encrypted using User Migratable Storage Key 115.

Figure 5:
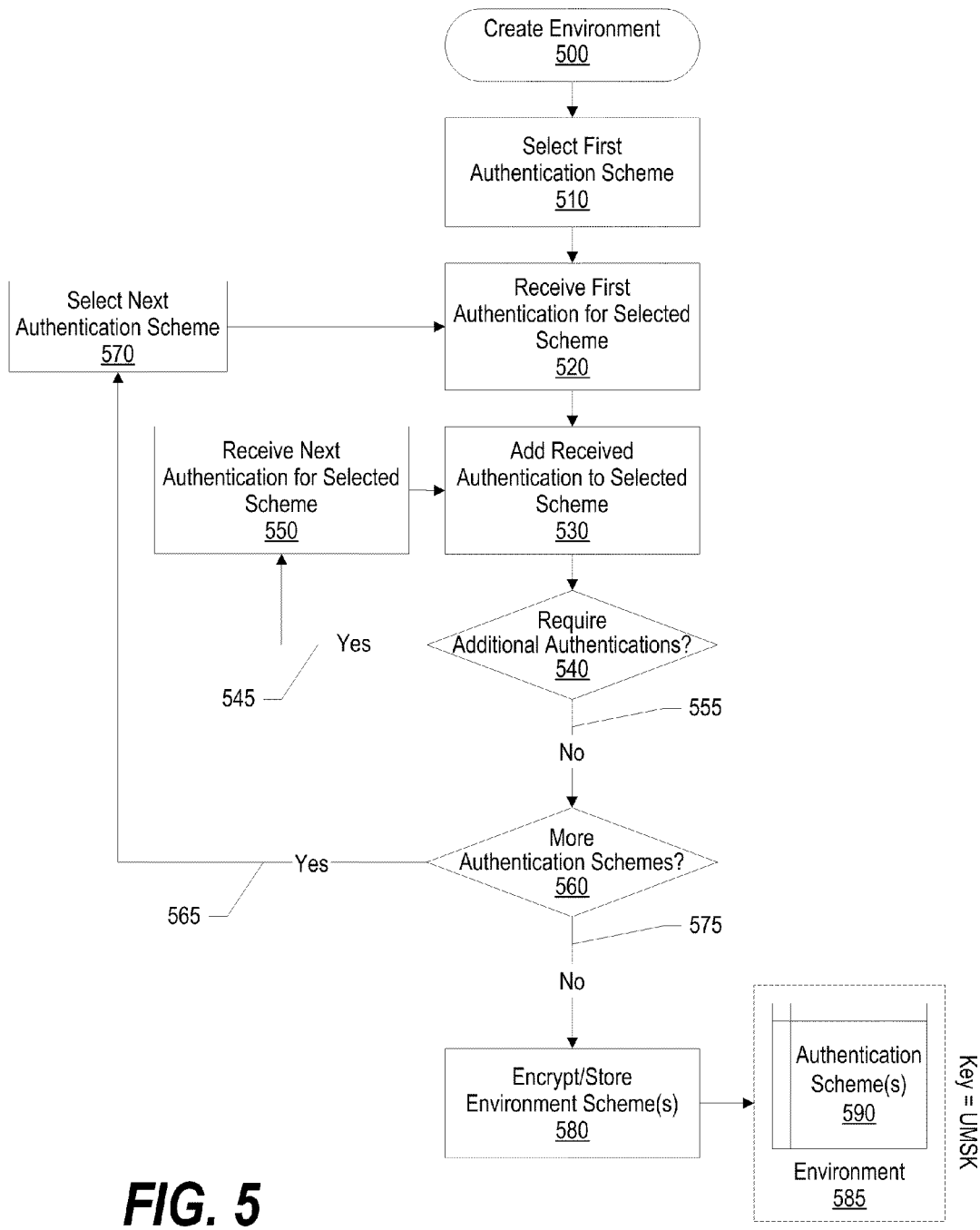
FIG. 5 is a more detailed flowchart showing the steps used to create environment authentication data.

FIG. 5 is a more detailed flowchart showing the steps used to create environment authentication data. Processing commences at 500 whereupon, at step 510, the first authentication scheme is selected for the environment (see FIG. 2 and corresponding text which depicted two encryption schemes for the user, one encryption scheme for the user's administrative assistant, and two encryption schemes for the user's spouse). At step 520, the first environment authentication data item is received for the selected environment authentication scheme. Examples of environment authentication data items include passwords, biometric data (e.g., fingerprint scans), smart cards, and other user identifier data. At step 530, the received environment authentication data item is added to the selected environment authentication scheme.

A determination is made as to whether the environment authentication scheme requires additional environment authentication data items (decision 540). If one or more additional environment authentication data items are to be required for the selected environment authentication scheme, then decision 540 branches to "yes" branch 545 whereupon, at step 550, the next environment authentication data item is received for the selected scheme and processing loops back to add the newly received environment authentication data item to the selected environment authentication scheme. This looping continues until no more environment authentication data items are required for authenticating the selected environment authentication scheme, at which point decision 540 branches to "no" branch 555.

A determination is made as to whether more environment authentication schemes are being created (decision 560). If more environment authentication schemes are being created, then decision 560 branches to "yes" branch 565 whereupon, at step 570, the next environment authentication scheme is selected and processing loops back to receive the environment authentication data items for the newly selected environment authentication scheme. This looping continues until no more environment authentication schemes are being created, at which point decision 560 branches to "no" branch 575.

At step 580, the received environment authentication data items are encrypted (e.g., using the User Migratable Storage Key) and stored as environment 585. Environment 585 is a secure storage location that includes environment authentication schemes 590 that include one or more stored environment authentication data items. In one embodiment, the TPM is used to generate a random number that is associated with the environment as a unique environment identifier. In a further embodiment, the result is encrypted using a non-migratable key that is unique to the TPM. A more detailed approach includes (i) using the TPM to create a random number; (ii) using the TPM to create an HMAC (a keyed-hash message authentication code) of the random number and tpmProof (a unique identifier for the TPM) and the environment; and (iii) the TPM wraps (encrypts using a public key) data that includes three data elements: (1) the TMP-generated random number, (2) the environment, and (3) the HMAC of the random number, tpmProof, and the environment. Using this technique, the next time the environment is loaded into the TPM, the TPM unwraps the data and verifies the tpmProof. If it is correct, the TPM assumes that the other data items are associated with the environment.

Figure 6:
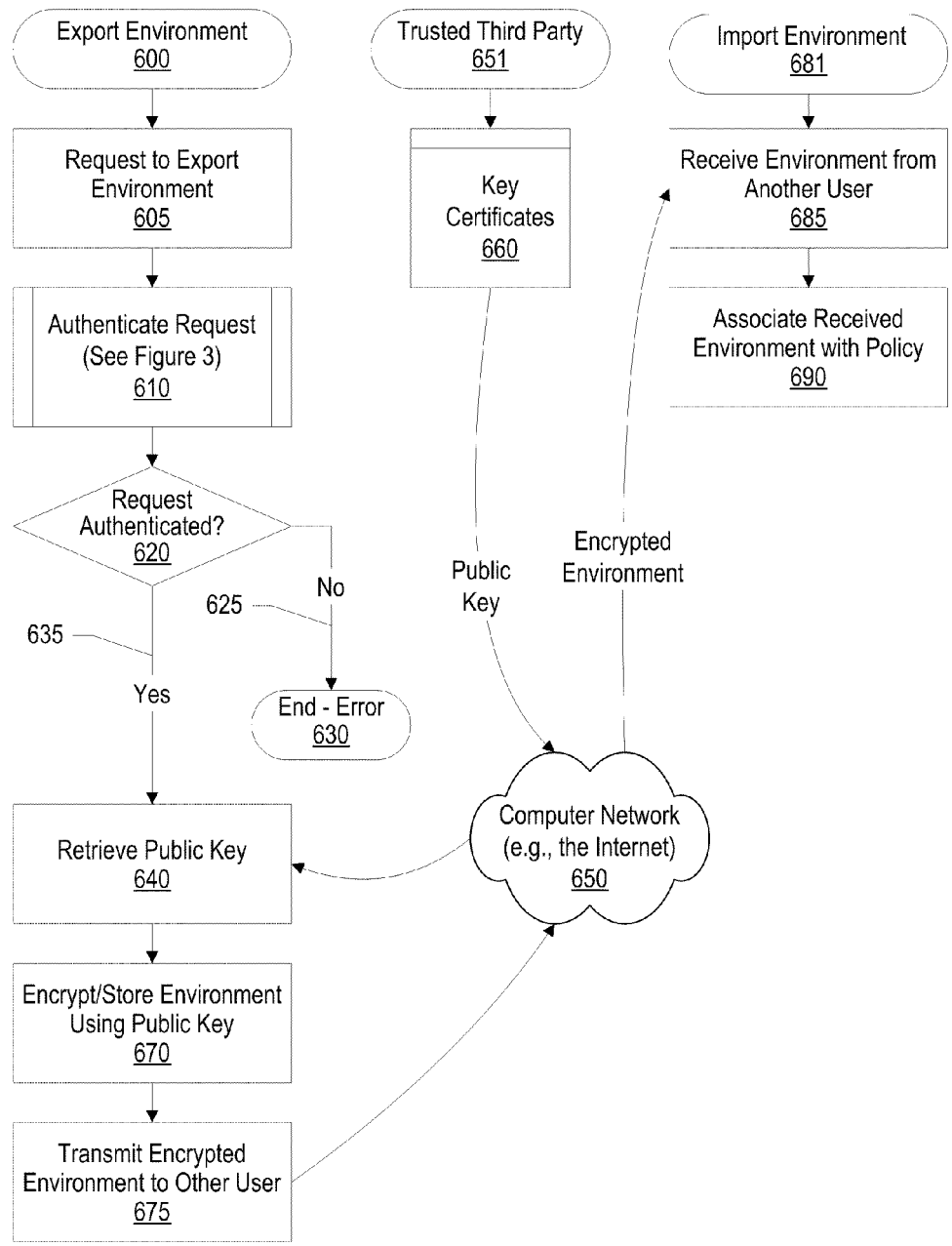
FIG. 6 is a flowchart showing the steps used to export environment authentication data from a first information handling system and importing the environment authentication data at a second information handling system.

FIG. 6 is a flowchart showing the steps used to export environment authentication data from a first information handling system and importing the environment authentication data at a second information handling system. Processing undertaken by the computer system that is exporting the environment is shown commencing at 600. At step 605, a request is received to export an environment. At predefined process, the request is authenticated (see FIG. 3 and corresponding text for processing details). A determination is made as to whether the request was authenticated (decision 620). If the request was not successfully authenticated, decision 620 branches to "no" branch 625 whereupon processing ends with an error at 630.

On the other hand, if the request was successfully authenticated, then decision 620 branches to "yes" branch 635 whereupon, at step 640, a public key corresponding to the computer system that will be importing the environment is retrieved. In one embodiment, the public key is retrieved via computer network 650, such as the Internet, that receives the public key from trusted third party 651 that maintains key certificates 660. At step 670, the environment data that is being exported is encrypted using the received public key. In this manner, only holder of the private key that corresponds to the public key will be able to decrypt the encrypted environment data. At step 675, the encrypted environment data (e.g., stored environment authentication data, environment authentication schemes, etc.) is transmitted to the other computer system via computer network 650.

Processing performed by the computer system that is receiving and importing the exported environment data commences at 681. At step 685, the environment data is received from the exporting computer system via computer network 650. Because the importing computer system has the private key that corresponds to the public key that was used to encrypt the environment data, the importing computer system is able to use the environment data. In one embodiment, the received encrypted environment data is decrypted using the private key and then re-encrypted using a User Migratable Storage Key that is used to store items on the importing computer system. At step 690, the received environment data is associated with a policy. Policies are associated with encryption keys used at the importing computer system.

Applying the example set forth in FIG. 2 to the flowchart shown in FIG. 6, suppose that the user wishes to receive the environment data corresponding to the user's administrative assistant. The administrative assistant uses the export processing shown in Figure 600 to encrypt the administrative assistant's environment data (e.g., passwords, biometric data, etc.) and send the encrypted data to the user. The user uses the import processing that commences at 681 to receive the user's administrative assistant's environment data. However, because the user's administrative assistant's environment data is encrypted, it will not be accessible by the user.

Figure 7:
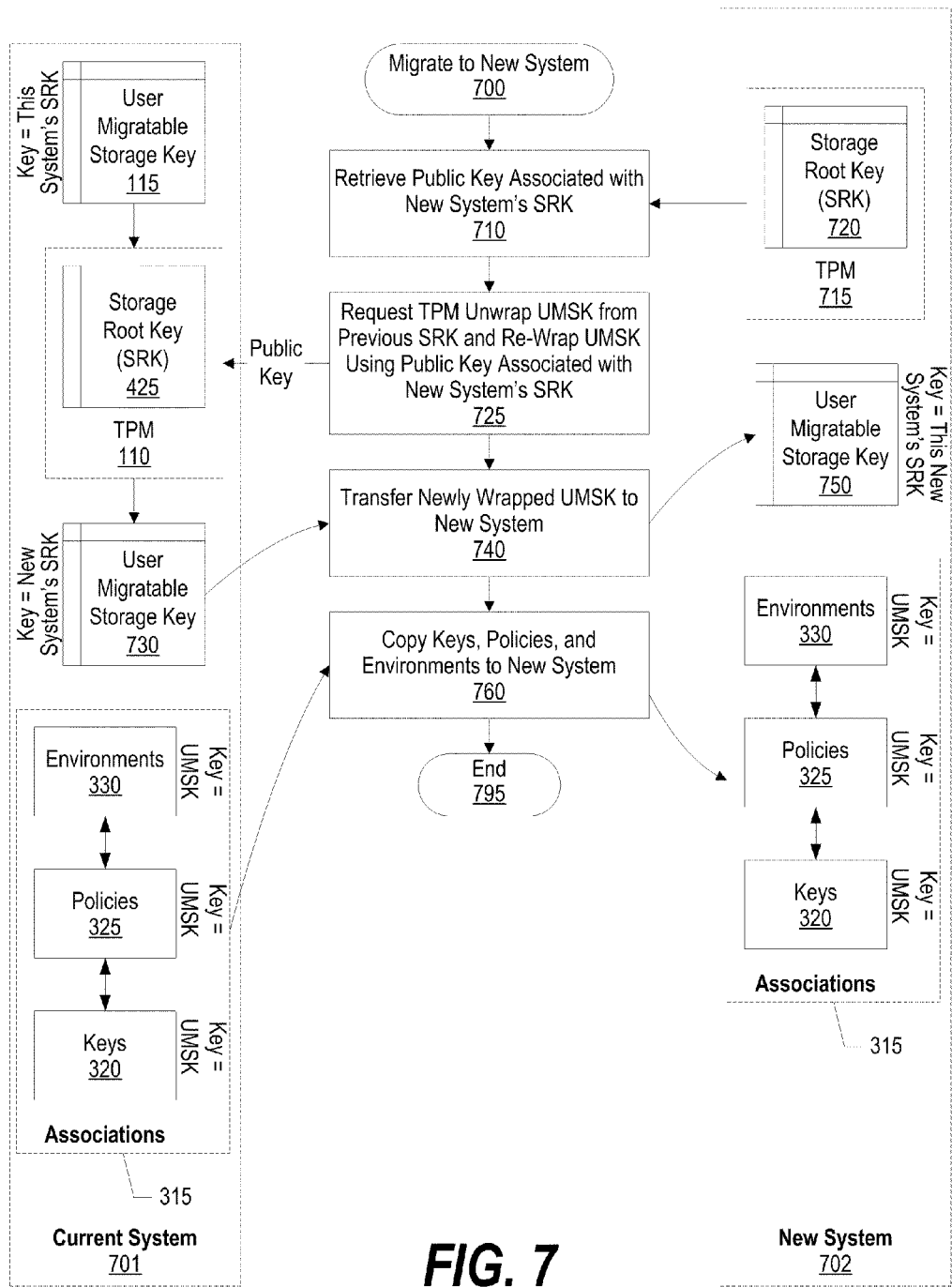
FIG. 7 is a flowchart showing the steps used to migrate keys, policies, and environment authentication data from a first information handling system to a second information handling system.

FIG. 7 is a flowchart showing the steps used to migrate keys, policies, and environment authentication data from a first information handling system to a second information handling system. When a user is migrating from current system 701 to new system 702, encryption keys 320, policies 325, and environments 330 can be transferred without having to re-encrypt them. Processing commences at 700 whereupon, at step 710, the public key associated with new system 702's Storage Root Key 720 is received from new system 702's TPM 715.

At step 725, a request is made to current system 701's TPM 110 to unwrap (decrypt) User Migratable Storage Key 115 used by current system 701 and rewrap (encrypt) the User Migratable Storage Key with the public key corresponding to new system 702. This results in User Migratable Storage Key 730 that is encrypted with the public key corresponding to the Storage Root Key of new computer system 702.

At step 740, User Migratable Storage Key 730 (encrypted with the public key provided in step 710) is transferred to new system 702 and stored as User Migratable Storage Key 750 (encrypted using Storage Root Key 720 maintained by new system 702's TPM 715). At step 760, encryption keys 320, policies 325, and environments 330 are copied from current system 701 to new system 702. The copying of the encryption keys, policies, and environments includes the copying of associations 315 between keys and policies and the associations between environments and policies. Note that the keys, policies, and environments do not have to be decrypted and re-encrypted in order to be copied to new system 702. The encryption keys, policies, and environments are each already encrypted with the User Migratable Storage Key that was transferred to the new system at step 740. Migration processing thereafter ends at 795.

Figure 8:
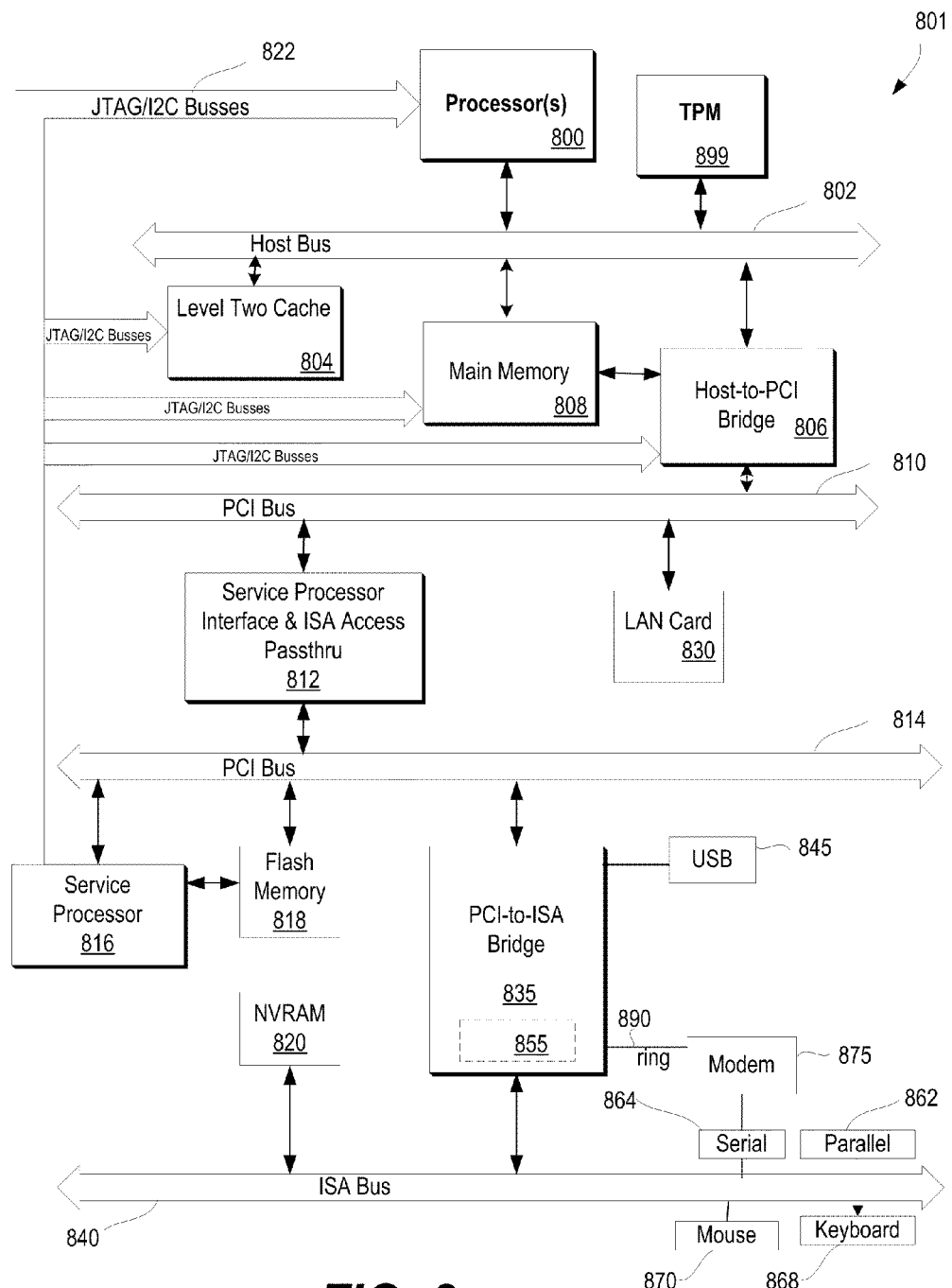
FIG. 8 is a block diagram of a data processing system in which the methods described herein can be implemented.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions. Trusted Platform Module (TPM 899) is attached to a bus accessible by processors 800. In one embodiment, TPM 899 is attached to host bus 802. A Storage Root Key (SRK) is maintained within TPM 899 and used to store encrypted data, such as a User Migratable Storage Key (UMSK), that is encrypted by the TPM using the SRK.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
configuring at least one processor device to perform the functions of:
receiving an encryption key request for an encryption key;
receiving an environment identifier;
determining whether the received environment identifier is associated with the requested encryption key, the determining resulting in an association determination;
in response to the association determination being that the received environment identifier is associated with the requested encryption key:
receiving one or more user-supplied environment authentication data items from a user;
retrieving one or more stored environment authentication data items from a secure storage location, wherein the retrieved stored environment authentication data items correspond to the received environment identifier;
authenticating the received environment authentication data items using the retrieved stored environment authentication data items;
allowing use of the requested encryption key in response to the authenticating resulting in a successful authentication; and
denying use of the requested encryption key in response to the authenticating resulting in an unsuccessful authentication;
denying use of the requested encryption key in response to the association determination being that the received environment identifier is not associated with the requested encryption key; and
wherein the stored environment authentication data and the requested encryption key are each encrypted with a first key, and wherein the first key is encrypted with a second key, the second key being maintained within a hardware-based Trusted Platform Module (TPM), and the requested encryption key, the stored environment authentication data items, and the first key being stored on one or more nonvolatile storage devices accessible to a first information handling system.

2. The method of claim 1 further comprising:
prior to receiving the encryption key request:
associating a unique environment identifier with an environment; and
receiving the environment authentication data items and storing the received environment authentication data items in the secure storage location, wherein the environment corresponds to the stored environment authentication data items.

3. The method of claim 1 wherein the determining further comprises:
determining whether the requested encryption key is associated with a policy; and
determining whether the requested environment identifier is also associated with the policy.

4. The method of claim 1 wherein the first key comprises a User Migratable Storage Key (UMSK), and wherein the second key comprises a Storage Root Key (SRK).

5. The method of claim 4 further comprising:
exporting the stored environment authentication data items from the first information handling system to a second information handling system, wherein the first information handling system is connected to the second information handling system via a computer network, the exporting including:
receiving a public key that corresponds to the second information handling system;
decrypting the stored environment authentication data using the UMSK;
encrypting the decrypted stored environment authentication data using the received public key;
transmitting the stored environment authentication data encrypted with the public key to the second information handling system via the computer network; and
importing the stored environment authentication data at the second information handling system, the importing including:
receiving the stored environment authentication data encrypted with the public key;
storing, on a second nonvolatile storage device accessible to the second information handling system, the stored environment authentication data encrypted with the public key; and
associating the received stored environment authentication data with a second policy, the second policy being associated with a second encryption key stored at the second information handling system.

6. The method of claim 4 further comprising:
prior to receiving the encryption key request, storing a plurality of environment authentication schemes pertaining to a plurality of users, wherein the user is one of the plurality of users, wherein each of the environment authentication schemes includes one or more environment authentication data items, and wherein the environment authentication schemes are encrypted with the UMSK; and
selecting one of the plurality of environment authentication schemes based on the received environment identifier, wherein the retrieved stored environment authentication data items are the one or more environment authentication data items stored and included in the selected environment authentication scheme.

7. The method of claim 6 further comprising:
prior to receiving the encryption key request:
creating a plurality of policies, each of the policies encrypted with the UMSK,
creating a plurality of encryption keys, the plurality of encryption keys including the requested encryption key, and each of the plurality of encryption keys encrypted with the UMSK;
associating at least one of the created environment authentication schemes with a plurality of the created policies; and associating one or more of the created policies with one or more of the created encryption keys.

8. The method of claim 7 wherein the determining whether the received environment identifier is associated with the requested encryption key further includes determining whether the requested encryption key is associated with one of the policies that is associated with the received environment identifier that corresponds to one of the created environment authentication schemes, and the method further comprises:

migrating the plurality of stored environment authentication schemes, the plurality of policies, and the plurality of encryption keys from the first information handling system to a second information handling system, the migrating including:
decrypting, within the TPM, the UMSK;
re-encrypting, within the TPM, the UMSK with a public key corresponding to a second SRK maintained by a second TPM, the second TPM being included in the second information handling system;
transferring the re-encrypted UMSK from the first information handling system to the second information handling system;
copying the plurality of stored environment authentication schemes, the plurality of policies, and the plurality of encryption keys from the first information handling system to the second information handling system;
copying the associations between the plurality of environment authentication schemes and the plurality of policies from the first information handling system to the second information handling system; and
copying the associations between the plurality of policies and the plurality of encryption keys from the first information handling system to the second information handling system.

9. The method of claim 8 further comprising:
receiving, at the second information handling system, a second encryption key request for a second encryption key;
receiving a second environment identifier;
determining whether the received second environment identifier is associated one of the policies copied to the second information handling system that is associated with the requested second encryption key, the determining resulting in a second association determination;
in response to the second association determination being that the received second environment identifier is associated with one of the policies that is associated with the requested encryption key:
receiving one or more second user-supplied environment authentication data items from the user;
retrieving one or more second stored environment authentication data items from a second secure storage location accessible from the second information handling system, wherein the retrieved second stored environment authentication data items correspond to one of the environment authentication schemes copied to the second information handling system that corresponds to the received second environment identifier;
authenticating the received second stored environment authentication data items using the retrieved second stored environment authentication data items;
allowing use of the requested second encryption key in response to the authenticating resulting in a successful authentication; and
denying use of the requested second encryption key in response to the authenticating resulting in an unsuccessful authentication; and
denying use of the requested second encryption key in response to the second association determination being that the received second environment identifier is not associated with one of the policies that is associated with the requested encryption key.

10. An information handling system comprising:
one or more processors;
a memory accessible by at least one of the processors;
one or more nonvolatile storage devices accessible by at least one of the processors;
a Trusted Platform Module (TPM) accessible by at least one of the processors; and
a set of instructions stored in the memory, wherein one or more of the processors executes the set of instructions in order to perform actions of:
receiving an encryption key request for an encryption key;
receiving an environment identifier;
determining whether the received environment identifier is associated with the requested encryption key, the determining resulting in an association determination;
in response to the association determination being that the received environment identifier is associated with the requested encryption key:
receiving one or more user-supplied environment authentication data items from a user;
retrieving one or more stored environment authentication data items from a secure storage location, wherein the retrieved stored environment authentication data items correspond to the received environment identifier;
authenticating the received environment authentication data items using the retrieved stored environment authentication data items;
allowing use of the requested encryption key in response to the authenticating resulting in a successful authentication; and
denying use of the requested encryption key in response to the authenticating resulting in an unsuccessful authentication;
denying use of the requested encryption key in response to the association determination being that the received environment identifier is not associated with the requested encryption key; and
wherein the stored environment authentication data and the requested encryption key are each encrypted with a first key, and wherein the first key is encrypted with a second key, the second key being maintained within the TPM, and the requested encryption key, the stored environment authentication data items, and the first key being stored on the one or more nonvolatile storage devices.

11. The information handling system of claim 10, wherein the set of instructions perform further actions including:
prior to receiving the encryption key request:
associating a unique environment identifier with an environment; and
receiving the environment authentication data items and storing the received environment authentication data items in the secure storage location, wherein the environment corresponds to the stored environment authentication data items.

12. The information handling system of claim 10 wherein the first key comprises a User Migratable Storage Key (UMSK), and wherein the second key comprises a Storage Root Key (SRK), wherein the instructions that perform the determining perform further actions comprising:
  determining whether the requested encryption key is associated with a policy; and
  determining whether the requested environment identifier is also associated with the policy.

13. The information handling system of claim 12 further comprising:
  a network adapter that connects the information handling system to a computer network, wherein the set of instructions perform further actions including:
  exporting the stored environment authentication data items from the information handling system to a second information handling system via the computer network, the exporting including:
    receiving a public key that corresponds to the second information handling system;
    decrypting the stored environment authentication data using the UMSK;
    encrypting the decrypted stored environment authentication data using the received public key;
    transmitting the stored environment authentication data encrypted with the public key to the second information handling system via the computer network.

14. The information handling system of claim 12, wherein the set of instructions perform further actions including:
  prior to receiving the encryption key request, storing, on one or more of the nonvolatile storage devices, a plurality of environment authentication schemes pertaining to a plurality of users, wherein the user is one of the plurality of users, wherein each of the environment authentication schemes includes one or more environment authentication data items, and wherein the environment authentication schemes are encrypted with the UMSK; and
  selecting one of the plurality of environment authentication schemes based on the received environment identifier, wherein the retrieved stored environment authentication data items are the one or more environment authentication data items stored and included in the selected environment authentication scheme.

15. The information handling system of claim 14, wherein the set of instructions perform further actions including:
  prior to receiving the encryption key request:
    creating a plurality of policies, each of the policies encrypted with the UMSK,
    creating a plurality of encryption keys, the plurality of encryption keys including the requested encryption key, and each of the plurality of encryption keys encrypted with the UMSK;
    associating at least one of the created environment authentication schemes with a plurality of the created policies; and
    associating one or more of the created policies with one or more of the created encryption keys.

16. The information handling system of claim 15 wherein the instructions that perform the action of determining whether the received environment identifier is associated with the requested encryption key further includes instruction that perform actions that determine whether the requested encryption key is associated with one of the policies that is associated with the received environment identifier that corresponds to one of the created environment authentication schemes, wherein the set of instructions perform further actions including:
  migrating the plurality of stored environment authentication schemes, the plurality of policies, and the plurality of encryption keys from the information handling system to a second information handling system, the migrating including:
    decrypting, within the TPM, the UMSK;
    re-encrypting, within the TPM, the UMSK with a public key corresponding to a second SRK maintained by a second TPM, the second TPM being included in the second information handling system;
    transferring the re-encrypted UMSK from the information handling system to the second information handling system via the computer network;
    copying the plurality of stored environment authentication schemes, the plurality of policies, and the plurality of encryption keys from the information handling system to the second information handling system via the computer network;
    copying the associations between the plurality of environment authentication schemes and the plurality of policies from the information handling system to the second information handling system via the computer network; and
    copying the associations between the plurality of policies and the plurality of encryption keys from the information handling system to the second information handling system via the computer network.

17. A computer program product stored in a storage device, comprising functional descriptive material that, when executed by a data processing system, causes the data processing system to perform actions that include:
  receiving an encryption key request for an encryption key;
  receiving an environment identifier;
  determining whether the received environment identifier is associated with the requested encryption key, the determining resulting in an association determination;
  in response to the association determination being that the received environment identifier is associated with the requested encryption key:
    receiving one or more user-supplied environment authentication data items from a user;
    retrieving one or more stored environment authentication data items from a secure storage location, wherein the retrieved stored environment authentication data items correspond to the received environment identifier;
    authenticating the received environment authentication data items using the retrieved stored environment authentication data items;
    allowing use of the requested encryption key in response to the authenticating resulting in a successful authentication; and
    denying use of the requested encryption key in response to the authenticating resulting in an unsuccessful authentication;
  denying use of the requested encryption key in response to the association determination being that the received environment identifier is not associated with the requested encryption key; and
  wherein the stored environment authentication data and the requested encryption key are each encrypted with a first key, and wherein the first key is encrypted with a second key, the second key being maintained within a hardware-based Trusted Platform Module (TPM), and the requested encryption key, the stored environment authentication data items, and the first key being stored on one or more nonvolatile storage devices accessible to a first information handling system.

18. The computer program product of claim 17 wherein the functional descriptive material causes the data processing system to perform further actions comprising:

prior to receiving the encryption key request:
associating a unique environment identifier with an environment; and
receiving the environment authentication data items and storing the received environment authentication data items in the secure storage location, wherein the environment corresponds to the stored environment authentication data items.

19. The computer program product of claim 17 wherein the first key comprises a User Migratable Storage Key (UMSK), and wherein the second key comprises a Storage Root Key (SRK), and wherein the functional descriptive material that performs the determining causes the data processing system to perform further actions comprising:

determining whether the requested encryption key is associated with a policy; and
determining whether the requested environment identifier is also associated with the policy.

20. The computer program product of claim 19 wherein the functional descriptive material causes the data processing system to perform further actions comprising:

exporting the stored environment authentication data items from the first information handling system to a second information handling system, wherein the first information handling system is connected to the second information handling system via a computer network, the exporting including:
receiving a public key that corresponds to the second information handling system;
decrypting the stored environment authentication data using the UMSK;
encrypting the decrypted stored environment authentication data using the received public key;
transmitting the stored environment authentication data encrypted with the public key to the second information handling system via the computer network.

21. The computer program product of claim 20 wherein the functional descriptive material causes the data processing system to perform further actions comprising:

prior to receiving the encryption key request, storing a plurality of environment authentication schemes pertaining to a plurality of users, wherein the user is one of the plurality of users, wherein each of the environment authentication schemes includes one or more environment authentication data items, and wherein the environment authentication schemes are encrypted with the UMSK; and
selecting one of the plurality of environment authentication schemes based on the received environment identifier, wherein the retrieved stored environment authentication data items are the one or more environment authentication data items stored and included in the selected environment authentication scheme.

22. The computer program product of claim 21 wherein the functional descriptive material causes the data processing system to perform further actions comprising:

prior to receiving the encryption key request:
creating a plurality of policies, each of the policies encrypted with the UMSK,
creating a plurality of encryption keys, the plurality of encryption keys including the requested encryption key, and each of the plurality of encryption keys encrypted with the UMSK;
associating at least one of the created environment authentication schemes with a plurality of the created policies; and
associating one or more of the created policies with one or more of the created encryption keys.

23. The computer program product of claim 22 wherein the actions that determine whether the received environment identifier is associated with the requested encryption key further includes determining whether the requested encryption key is associated with one of the policies that is associated with the received environment identifier that corresponds to one of the created environment authentication schemes, and wherein the functional descriptive material causes the data processing system to perform further actions comprising:

migrating the plurality of stored environment authentication schemes, the plurality of policies, and the plurality of encryption keys from the first information handling system to a second information handling system, the migrating including:
decrypting, within the TPM, the UMSK;
re-encrypting, within the TPM, the UMSK with a public key corresponding to a second SRK maintained by a second TPM, the second TPM being included in the second information handling system;
transferring the re-encrypted UMSK from the first information handling system to the second information handling system;
copying the plurality of stored environment authentication schemes, the plurality of policies, and the plurality of encryption keys from the first information handling system to the second information handling system;
copying the associations between the plurality of environment authentication schemes and the plurality of policies from the first information handling system to the second information handling system; and
copying the associations between the plurality of policies and the plurality of encryption keys from the first information handling system to the second information handling system.

* * * * *